2,698,800

METHOD OF PRODUCING SKINLESS FRANKFURTERS

Dean E. Rueckert, Mokena, Ill., assignor to Swift & Company, Chicago, Ill., a corporation of Illinois No Drawing. Application June 28, 1950,
Serial No. 170,949

9 Claims. (Cl. 99—109)

This invention relates to the treatment of meat or meat products and more particularly to a method for tying meats or meat products together and the products so formed.

Many meats and meat products are tied with string during the manufacture or processing thereof to hold the product in a definite form, as, for example, a veal roll, or to separate one item of product from another, as in the case of sausage or frankfurter links. In the past, the rather widespread use of cotton string for these purposes has created many problems both to the processor and to the consumer. In the case of rolled meats, such as roasts and the like, the string tends to char during cooking, but, as a rule, retains its form to the extent that the consumer has to cut the string and then remove it from around or from within the meat, or from the casing, an undesirable necessity both from the standpoint of convenience and of sanitary handling. In the case of products such as frankfurts or the like which are placed in artificial casings for smoking and curing and then have the casings removed to produce the so-called "skinless frankfurts," the problem heretofore faced by the processor has been even more serious. The frankfurts are commonly linked in long chains, each frankfurt being contained within one segment of a long artificial casing, and the segments separated one from the other by a twist between the links. Each link is further separated and the aforesaid twist retained by means of a short piece of string tied tightly around the casing between the links. This requires that a time-consuming and expensive hand-peeling operation be performed to remove the string and peel the casing from each individual frankfurt. Automatic peeling equipment, using compressed air to open the casings, has been devised but the string tying of the links has proven a stumbling block to the operation of such equipment.

It is therefore an object of the present invention to provide a method for tying meats and meat products which overcomes the disadvantages noted above.

It is a further object of the invention to provide a novel meat product.

It is an additional object of the invention to provide a method for tying frankfurt links together whereby the links may be readily stripped by automatic peeling means.

Additional objects, if not specifically set forth herein, will be readily apparent to one skilled in the art from the following detailed description of the invention.

In general, the present invention contemplates broadly the combination with a shaped meat product of a synthetic binding therefor, dissolvable or disintegrable at cooking temperatures.

More specifically, the invention comprises combining with a single meat product, such as a rolled roast or the like, or with a plurality of the same or different kinds of meat, or with a plurality of linked products, such as frankfurts or the like, a synthetic binding or string capable of being dissolved by heat. Such a string must possess, at least in the case of use in combination with a roast or the like, the property of nontoxicity. The string must also have relatively little elasticity in order to insure that knots tied therein will hold indefinitely, i. e., the string should be limp and should not possess the rubber-like characteristics of stretching and then recovering its original length.

The present invention is not directed to any particular composition of matter comprising the synthetic string, but it has been found that the most suitable type of string is one produced from fibrous alginic acid by any suitable method known to the art. This alginate string, prepared as for example in U. S. Patent No. 2,477,861 to Clark, may be used to tie the casings between individual frankfurt links after which the links are smoked in the usual manner known to the art. Upon removing the links from the smoke, they are cooked in water at a temperature of about 170° F. for a period of about 15 minutes. Preferably, instead of pure water, a 0.1% solution of citrate is used, and the alginate strings separating the links treated in this manner are found to be disintegrated either entirely or to the point where they may be dislodged by means of a blast of air directed inside the casings or by means of a blast of air, water or steam from the outside. The effect is the same whether completely disintegrated or not, obviating the necessity of cutting each individual string between the frankfurt links.

Other types of string may be used, as, for example, string made from polyvinyl alcohol resins or other suitable resins. The chief requirements for the string as aforesaid are that it be limp, flexible, non-toxic, relatively inelastic, capable of being tied in a non-slipping knot, and capable of being disintegrated by heating in the range of from 170° F. to 200° F.

These dissolvable strings, either of the alginate or any other type meeting the requirements set forth above, when applied to a rolled meat, such as a roast or the like, permit the cooking of such a meat in the usual manner, the string retaining its strength for a sufficient period to permit the cooked roast to retain its desired shape, but under the continued heating at cooking temperatures, dissolving and disintegrating so that when the roast is completely cooked no messy string need be cut away from the meat, and the meat may be carved directly without the necessity of handling it to remove the string.

The term "meat product" as used in the appended claims is intended to cover all types of meats which are normally rolled or tied in any manner prior to cooking, as, for example, cuts of beef, lamb, veal and the like, and also such types of prepared meats as frankfurts, sausages and the like, which are commonly linked together and separated by string.

Obviously, many modifications and variations of the invention as hereinbefore set forth may be made without departing from the spirit and scope thereof, and therefore only such limitations should be imposed as are indicated in the appended claims.

I claim:
1. A method of treating meat products which comprises forming said meat products into desired shapes and tying said formed meat products with a synthetic binding string disintegrative at normal cooking temperatures.
2. A method of treating meat products which comprises forming said meat products into desired shapes, applying directly to the surfaces of said formed meat products a heat-disintegrative synthetic string, and tying said string around said meat products to retain the same in the desired shape.
3. A method of treating frankfurts to produce "skinless" frankfurts which comprises forming individual links of frankfurts within an artificial non-disintegrative casing, separating said individual links by tying the casing between the links with a heat-disintegrative synthetic string, smoking the tied links, and thereafter heating said tied links in a citrate solution to disintegrate the said synthetic string whereby the casing may be readily stripped from the frankfurts.
4. As a new food product, the combination of a shaped meat product and a synthetic, heat-disintegrative binding therefor.
5. As a new food product, the combination of a meat product formed in a desired shape and a synthetic, heat-disintegrative string passing around said meat product to retain it in the desired shape.
6. In a process of producing skinless frankfurters the steps comprising encasing a relatively long mass of prepared meat within an artificial casing, tightly winding water soluble tie strings about the casing at spaced intervals along the length thereof to separate the meat into individual sections and thus convert the elongated filled casing into a chain of links, then subjecting the chain of links to smoking and heating to cure and at least partially cook the meat while retained in link form within the casing, then subjecting the chain to moisture to dissolve the tie strings, and then deskinning the chain to remove the casing and produce a series of individual skinless frankfurters.

7. A method of treating meat products which comprises forming said meat products into desired shapes, tying said formed meat products with a synthetic binding string, disintegrative at normal cooking temperatures, said string being in direct contact with the surfaces of said meat products, and thereafter cooking said meat products whereby said binding string is disintegrated.

8. In a process of producing skinless frankfurters, the steps comprising encasing a relatively long mass of prepared meat within an artificial casing, tightly winding water-disintegratable tie strings about the casing at spaced intervals along the length thereof to separate the meat into individual sections and thus convert the elongated filled casing into a chain of links, then subjecting the chain of links to smoking and heating to cure and at least partiially cook the meat while retained in link form within the casing, then subjecting the chain to moisture to disintegrate the tie strings, and then deskinning the chain to remove the casing and produce a series of individual skinless frankfurters.

9. In a process of producing skinless frankfurters, the steps comprising encasing a relatively long mass of prepared meat within an artificial casing, tightly winding water soluble tie strings made of alginate fibers about the casing at spaced intervals along the length thereof to separate the meat into individual sections and thus convert the elongated filled casing into a chain of links, then subjecting the chain of links to smoking and heating to cure and at least partially cook the meat while retained in link form within the casing, then subjecting the chain to moisture to dissolve the tie strings, and then deskinning the chain to remove the casing and produce a series of individual skinless frankfurters.

References Cited in the file of this patent

UNITED STATES PATENTS

| | | |
|---|---|---|
| 1,964,011 | Vogt | June 26, 1934 |

FOREIGN PATENTS

| | | |
|---|---|---|
| 386,161 | Great Britain | Jan. 12, 1933 |

OTHER REFERENCES

"Scientific American," June 1947, page 258.